United States Patent
Miller et al.

(10) Patent No.: US 8,090,861 B2
(45) Date of Patent: Jan. 3, 2012

(54) CONTENT MANAGEMENT IN PEER-TO-PEER CONTENT DISTRIBUTION CLOUDS

(75) Inventors: John L. Miller, Cambridge (GB); Armando Garcia-Mendoza, Cambridge (GB); Christos Gkantsidis, Cambridge (GB); Pablo Rodriguez Rodriguez, Barcelona (ES); Stuart Ranson, Ranson (GB)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 12/301,462

(22) PCT Filed: Apr. 5, 2007

(86) PCT No.: PCT/US2007/008675
§ 371 (c)(1),
(2), (4) Date: Nov. 18, 2007

(87) PCT Pub. No.: WO2007/136464
PCT Pub. Date: Nov. 29, 2007

(65) Prior Publication Data
US 2009/0198825 A1    Aug. 6, 2009

(30) Foreign Application Priority Data
May 19, 2006  (EP) .................... 06270051

(51) Int. Cl.
*G06F 15/16* (2006.01)
(52) U.S. Cl. ........ 709/231; 709/203; 709/217; 709/232; 707/770; 707/804; 370/390; 370/394
(58) Field of Classification Search ................. 709/203, 709/217, 231, 232; 707/770, 804; 370/390, 370/394
See application file for complete search history.

(56) References Cited

U.S. PATENT DOCUMENTS

| | | | |
|---|---|---|---|
| 7,225,228 B2 * | 5/2007 | Soto et al. ............ | 709/205 |
| 7,849,196 B2 * | 12/2010 | Gkantsidis et al. ........ | 709/227 |
| 2001/0016111 A1 * | 8/2001 | Fujihara ................ | 386/94 |
| 2003/0112823 A1 | 6/2003 | Collins et al. | |
| 2003/0182373 A1 * | 9/2003 | Soto et al. ............ | 709/204 |
| 2004/0148411 A1 | 7/2004 | Blawat et al. | |
| 2005/0268102 A1 * | 12/2005 | Downey ............ | 713/176 |
| 2005/0276252 A1 * | 12/2005 | Sizeland et al. ........ | 370/338 |
| 2005/0283537 A1 | 12/2005 | Li et al. | |

(Continued)

FOREIGN PATENT DOCUMENTS
KR    20050002560 A    1/2005
(Continued)

*Primary Examiner* — William C. Vaughn, Jr.
*Assistant Examiner* — Mohamed Ibrahim
(74) *Attorney, Agent, or Firm* — Lee & Hayes, PLLC (57) ABSTRACT

Managing content by influencing its distribution in the form of blocks or other units is crucial to the performance of a peer-to-peer content distribution system. We provide a content management module at each peer node to achieve this. The content management module implements a content request/response cycle in order to negotiate about blocks of content with other peer nodes. This cycle comprises an offer request, offer reply and a block request. These steps are preferably followed by data exchange and verification. The negotiation protocol used by our content management module provides a generic method that is advantageously used in conjunction with different encoding schemes such as full network coding and group network coding. In one embodiment we use group network coding and add information to the offer request and offer reply to facilitate efficient content distribution. Block request messages are selected to promote the use of on-the-fly decoding where possible.

17 Claims, 5 Drawing Sheets

U.S. PATENT DOCUMENTS

| | | | |
|---|---|---|---|
| 2006/0007947 A1* | 1/2006 | Li et al. | 370/432 |
| 2006/0200736 A1* | 9/2006 | Smit et al. | 715/500 |
| 2006/0212595 A1* | 9/2006 | Chen et al. | 709/232 |
| 2006/0224760 A1* | 10/2006 | Yu et al. | 709/231 |
| 2009/0138486 A1* | 5/2009 | Hydrie et al. | 707/10 |

FOREIGN PATENT DOCUMENTS

KR    20050051200 A    6/2005

* cited by examiner

CONTENT MANAGEMENT IN PEER-TO-PEER CONTENT DISTRIBUTION CLOUDS

RELATED APPLICATIONS

This application is a National Stage of International Application No. PCT/US2007/008675, filed 5 Apr., 2007, which claims priority from European Patent Application No. 06270051.3, filed on 19 May, 2006. Both applications are incorporated herein by reference.

TECHNICAL FIELD

This description relates generally to peer-to-peer content distribution and more specifically to content management in peer-to-peer content distribution clouds.

BACKGROUND

Content management in peer-to-peer file sharing clouds is a significant problem that needs to be addressed in order to increase the speed and ease with which all or most members of the cloud can receive content being shared.

In the past, large scale content distribution has been carried out using dedicated server farms providing infrastructure-based solutions. In this type of method, each client requiring content forms a dedicated high bandwidth connection to a server at a server farm and downloads content as required. This type of solution is costly for the content provider who must provide and maintain the server farm. Not only is this type of solution costly for content providers but it is not robust in that failure at a server prevents content from being provided to many clients. In addition, the solution is not easily scalable because each server supports a limited number of clients.

More recently a new paradigm for content distribution has emerged based on a distributed architecture using a co-operative network in which nodes share their resources (storage, CPU, bandwidth).

Cooperative content distribution solutions are inherently self-scalable, in that the bandwidth capacity of the system increases as more nodes arrive: each new node requests service from, and, at the same time, provides service to other nodes. Because each new node contributes resources, the capacity of the system grows as the demand increases, resulting in limitless system scalability. With cooperation, the source of the file, i.e. the server, does not need to increase its resources to accommodate the larger user population; this, also, provides resilience to "flash crowds"—a huge and sudden surge of traffic that usually leads to the collapse of the affected server. Therefore, end-system cooperative solutions can be used to efficiently and quickly deliver software updates, critical patches, videos, and other large files to a very large number of users while keeping the cost at the original server low.

Peer-to-peer file sharing protocols typically split a file for distribution into blocks or fragments. These blocks are distributed to nodes in a cloud, for example, in a random order and can be reassembled on a requesting node. Each node connects to remote nodes for the purpose of downloading locally missing blocks, and uploading remotely missing blocks to remote nodes.

The manner of forming and distributing the blocks of content has strong influence on the speed and ease with which all members of the cloud can receive the content being distributed. Managing content by influencing its distribution, in the form of blocks or other units is thus crucial to the performance of a peer-to-peer content distribution system.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Managing content by influencing its distribution in the form of blocks or other units is crucial to the performance of a peer-to-peer content distribution system. We provide a content management module at each peer node to achieve this. The content management module implements a content request/response cycle in order to negotiate about blocks of content with other peer nodes. This cycle comprises an offer request, offer reply and a block request. These steps are preferably followed by data exchange and verification. The negotiation protocol used by our content management module provides a generic method that is advantageously used in conjunction with different encoding schemes such as full network coding and group network coding (GNC). In one embodiment we use group network coding and add information to the offer request and offer reply to facilitate efficient content distribution. In addition, block request messages are selected to promote the use of on-the-fly decoding where possible.

The present example provides a method of negotiating which one or more blocks of content are to be exchanged between two peers in a peer to peer content distribution cloud the method comprising, at a peer node acting as a client node:
  sending an offer request message to another peer node acting as a server node to request an offer of one or more blocks of content available from that server node;
  receiving an offer reply message from the server node comprising information about one or more blocks of content available from the server node;
  selecting at least one block on the basis of the information in the offer reply message and sending a block request message to the server node to request the selected block(s); and wherein the blocks are encoded using Group Network Coding and the offer request message comprises information about all groups the client node still needs content for.

Preferably the offer reply message comprises information about only some of the total number of blocks of content available from the server. This information can be about some or all of those blocks which are ready for transmission and/or some or all of those blocks which it would require the server node to do work to encode.

Preferably the offer request message comprises information which at least partially indicates those blocks of content that are already available to the client node.

Preferably the offer request message comprises information which at least partially indicates those blocks of content that are required by the client node.

In some embodiments the offer reply message comprises an offer for each group that the client node still needs content for.

For example, the step of selecting at least one block comprises, for each group, identifying those of the offered blocks which are innovative and selecting one or more of the innovative blocks.

In some embodiments the selection of the one or more innovative blocks is carried out in a substantially random manner.

In other examples the selection of the one or more innovative blocks is carried out on the basis of the amount of content already obtained for the group concerned.

The invention also encompasses a computer program comprising computer program code means adapted to perform all the steps of any of the methods described herein when said program is run on a computer. For example, the computer program is embodied on a computer readable medium.

We also provide a peer node suitable for acting as a client node in a peer to peer content distribution cloud, and for negotiating which one or more blocks of content are to be exchanged between itself and another peer in the cloud using Group Network Coding the peer node comprising:

means for sending an offer request message to another peer node acting as a server node to request an offer of one or more blocks of content available from that server node; that offer request message comprising information about one or more groups the client node still needs content for;

means for receiving an offer reply message from the server node comprising information about one or more blocks of content available from the server node;

a processor arranged to select at least one block on the basis of the information in the offer reply message and to send a block request message to the server node to request the selected block(s).

Preferably the means for receiving the offer reply message is arranged to receive offer reply messages comprising information about only some of the total number of blocks of content available from the server.

In some embodiments the means for sending the offer request message is arranged to send offer request messages comprising information which at least partially indicates those blocks of content that are already available to the client node.

In some embodiments the means for sending the offer request message is arranged to send offer request messages comprising information which at least partially indicates those blocks of content that are required by the client node.

Preferably the means for receiving the offer reply message comprises means for receiving an offer for each group that the client node still needs content for.

Preferably the processor arranged to select at least one block is arranged to identify those of the offered blocks which are innovative for each group and to select one or more of the innovative blocks.

The invention also encompasses a method at a peer node acting as a server of blocks to other peers. Thus we provide a method of negotiating which one or more blocks of content are to be exchanged between two peers in a peer to peer content distribution cloud the method comprising, at a peer node acting as a server node:

receiving an offer request message from another peer node acting as a client node requesting an offer of one or more blocks of content available from the server node;

sending an offer reply message comprising information about one or more blocks of content available from the server node;

receiving a block request message from the client node requesting one or more selected ones of the offered blocks; and     sending the requested block(s) to the client node; and wherein the blocks are encoded using Group Network Coding and the offer request message comprises information about one or more groups the client node still needs content for.

A corresponding peer node suitable for acting as a server node is provided:

A peer node suitable for acting as a server node in a peer to peer content distribution cloud, and for negotiating which one or more blocks of content are to be exchanged between itself and another peer in the cloud using Group Network Coding the peer node comprising:

means for receiving an offer request message from another peer node acting as a client node requesting an offer or one or more blocks of content available from the server node; that offer request message comprising information about one or more groups the other peer node still needs content for;

means for sending an offer reply message comprising information about one or more blocks of content available from the server node;

means for receiving a block request message from the client node requesting one or more selected ones of the offered blocks; and     means for sending the requested block(s) to the client node.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices The term "cloud" is used herein to refer to a plurality of nodes in a communications network which have access to a peer-to-peer file sharing protocol and are using that protocol to try to obtain a copy of a particular piece of content such as a file that is being distributed. A cloud is also referred to as a graph in some literature. The nodes in the cloud each have one or more current connections using that protocol to others of the nodes. Thus nodes can join or leave the cloud as they drop or form connections to nodes already in the cloud. The connections need not always be actively used for content distribution although the connections need to be suitable for doing so using the particular protocol, which may or may not use network encoding. The connections can either be one-way or two-way connections. In the particular examples described herein all the connections are one-way such that the clouds are asymmetrical although the invention is applicable to and encompasses symmetrical clouds in which the connections are two-way with single connections supporting traffic in both upload and download directions. Also, a given node can be a member of more than one cloud at a time. For example, a first cloud where nodes are trying to obtain a copy of a video being shared and a second cloud where the nodes are trying to obtain a copy of a portfolio of digital still images. Clouds can be independent of one another or may overlap partially or fully.

Figure 1:
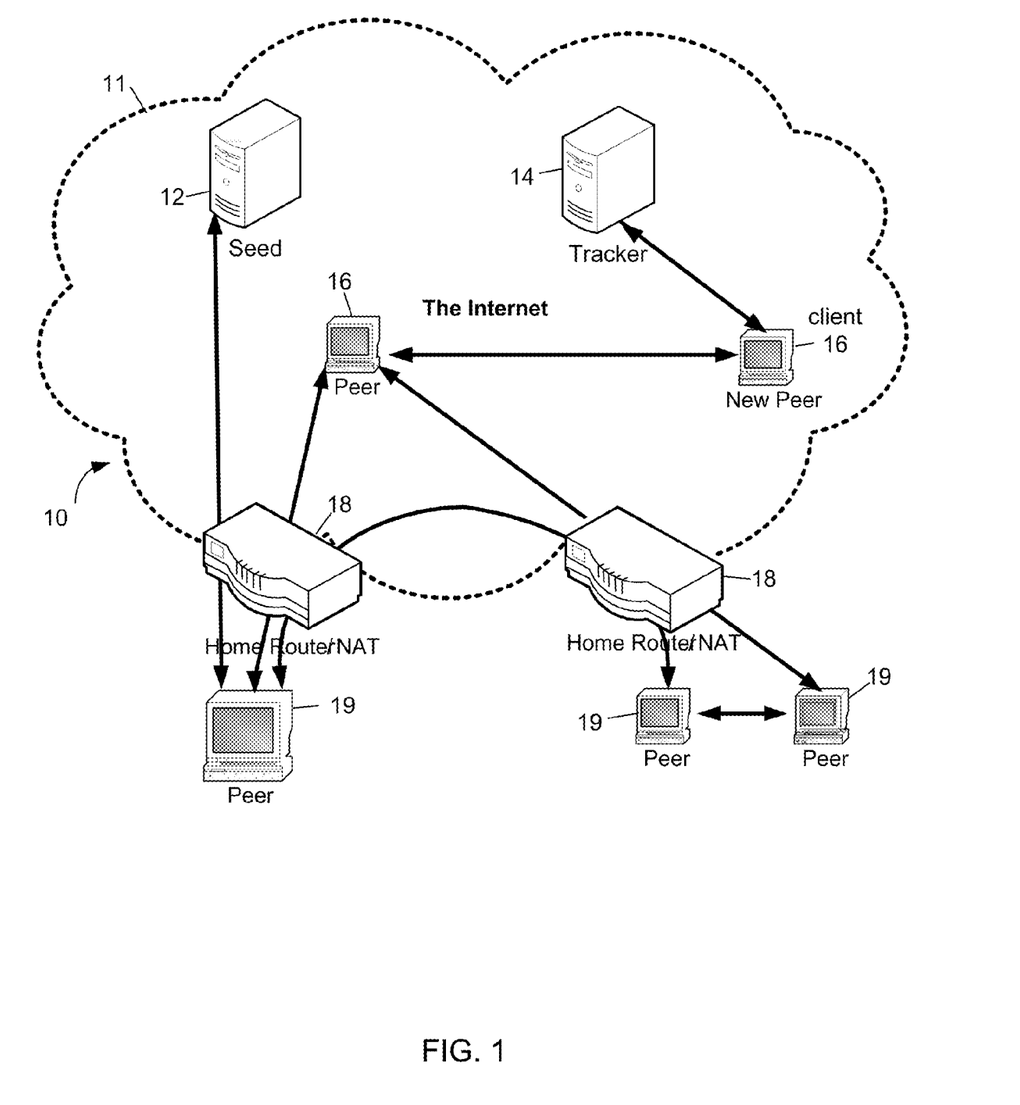
FIG. 1 is a schematic diagram of a peer to peer content distribution cloud.

FIG. 1 is a schematic diagram of a peer-to-peer file distribution cloud 10 comprising a plurality of nodes connected via the internet 11 or any other suitable communications network. The cloud itself may comprise many more nodes although for clarity less than ten are illustrated. Also, other nodes may be present connected between or directly to cloud members, although not being peer-to-peer file sharing participants and so not members of the cloud, these are not illustrated.

One or more seed nodes 12 are provided in the cloud 10. A seed node is one from which content, also referred to as files, originates. For example, suppose a company has a product demonstration video which it wishes to share publicly to the cloud members. This file can be placed on a seed node. The seed node is typically "always on" such that content files are available to upload from it for significant periods of time (barring maintenance periods etc.). Generally a seed node is active in uploading content and not downloading content. Only a limited and relatively small number of nodes in the cloud can download content from the seed node simultaneously. The seed node may or may not use the peer-to-peer file sharing protocol to upload the content to other members of the cloud. However, those other members go on to share the content or parts of the content with cloud members using the peer-to-peer file sharing protocol. Thus other cloud members can effectively act as seed nodes for periods of time during which they allow content to be uploaded from themselves but do not actively download content during that time. In some cases, once the seed node 12 has transmitted the content into the cloud, it is possible for the seed node 12 to go offline whilst the cloud 10 still functions.

One or more tracker nodes 14 are provided in the cloud 10. A tracker node 14 has information about cloud members such as whether a peer is participating in the cloud and has any information to share. This tracker node helps cloud members to find other cloud members which have required content.

A plurality of peer nodes 16, 19, also referred to as clients, are also present in the cloud. A peer node is one which requires the content being shared in the cloud and which may or may not also share parts of that content which it has obtained. A peer node may act as a temporary seed as mentioned above. In the example illustrated in FIG. 1, peer nodes 16 are located in a public network such as the internet whilst peer nodes 19 are located in private enterprise networks or home networks behind a firewall and/or network address translator (NAT) 18.

We specified an overall aim or goal for our peer-to-peer file sharing techniques as enabling all (or a majority of) cloud members to obtain a complete copy of the file being distributed in the shortest possible time. In some cases we also seek to reduce the number of times the seed nodes or originating servers need to provide uploads of the content to be shared.

As mentioned above, peer-to-peer content distribution systems typically divide a file, or other item of content to be distributed, into blocks which are distributed between peers. As soon as a peer node has received one or more blocks it is optionally able to act as a source for those blocks whilst concurrently receiving further blocks. In this way a peer node is able to act as a client and as a server at the same time.

Any suitable method of dividing the content into blocks can be used. For example, full network coding can be used, group network coding (GNC), server coding or any other method of forming blocks with or without the use of coding. More detail about full network coding, GNC and block creation is given below. The principle behind network coding is to allow peers to encode packets as opposed to server coding where only the seed nodes or central servers encode packets.

The process of creating the blocks requires computation, processing capacity and time and these requirements vary depending on the type of block creation method used. For example, full network coding is computationally more expensive than group network coding. Similarly, once blocks are received at a peer they need to be reassembled and/or decoded to obtain the content being distributed. This process is also computationally expensive. We seek to reduce the time taken for blocks of content to be decoded or reassembled and to reduce computation requirements where possible.

The number of blocks that a source file is divided into is typically very large. For example, a 4 GB file may be divided into 2048 blocks each of which is 2 MB in size. Consider a situation where a peer node has received say 2000 of the blocks and needs to obtain the remaining 48. Those 48 blocks might be rare in the cloud and the peer node needs to find which other nodes have the missing blocks. This is a difficult problem especially in large clouds. Consider also a peer node acting as a source. It has say 1000 blocks and receives a request from another peer node. Which of its 1000 blocks should it send to the requesting peer? Again, this is a difficult problem. If blocks are sent which the requesting node already has then time and resources are wasted. The present application provides methods of managing content to enable blocks to be transferred in efficient ways.

Full Network Coding

Figure 2:
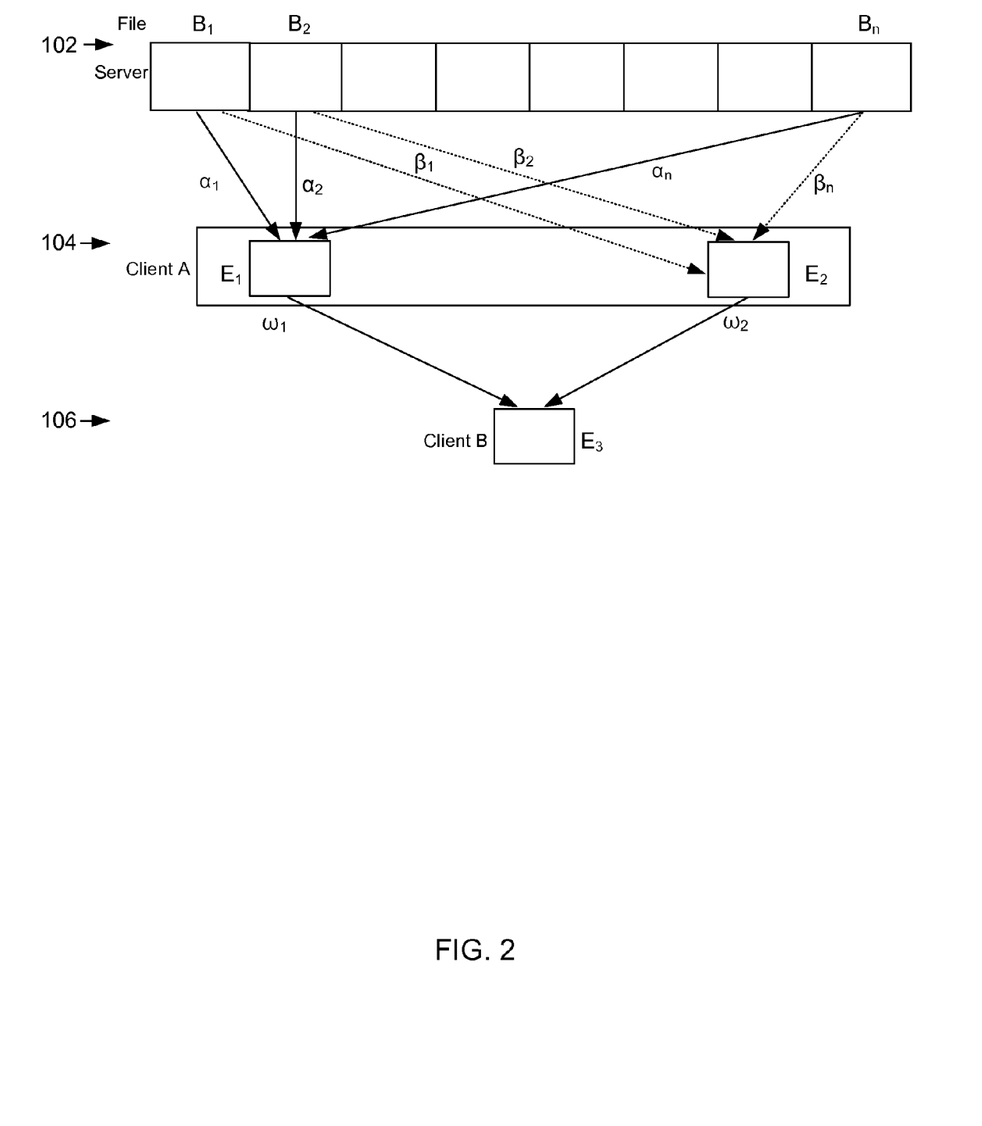
FIG. 2 shows a flow of blocks in a content distribution system using network coding.

Full network coding is now described with reference to FIG. 2 which shows the flow of blocks between a server 102 and two clients (or nodes), client A 104 and client B 106. A peer node can act as a client or server or both as mentioned earlier. Initially all the blocks, $B_1$-$B_n$, are held only by the server and not by any nodes. When client A contacts the server to get a block, the server produces an encoded block $E_1$ which is a linear combination of all the blocks in the file, such that:

$$E_1 = \alpha_1 B_1 + \alpha_2 B_2 + \ldots + \alpha_n B_n$$

where $\alpha_i$ are random coefficients. In order that the block size does not increase, these operations take place within a finite field, typically $GF(2^{16})$. The server then transmits to client A both the newly encoded block $E_1$ and the coefficient vector ($\alpha_i$). Client A may also receive a second encoded block $E_2$ from the server, created using a second set of random coefficients $\beta_i$. When client A needs to transmit a block to client B, client A creates a third encoded block, $E_3$ from a linear combination of $E_1$ and $E_2$ using random coefficients $\omega_i$.

When network coding is used as described above, a client can recover the original file after receiving n blocks that are linearly independent from each other, in a process similar to solving a set of linear equations. If the coefficients are chosen at random by each client, a client will be unlikely to receive a block which is not of use to that client. However, to further check this, clients may transmit the coefficient vector to a receiving client (client B in the example of FIG. 1) in advance of the block itself. The receiving client can then check whether the resultant block would provide it with any new information and only request the downloading of the block if it will be of use to the receiving client.

As described above, in order for a node to be able to generate a newly encoded block it must read all the blocks it has received into memory. This is processor intensive and introduces delays. Additionally when decoding, a node is faced by a very complex problem of decoding the encoded blocks, which is again processor intensive and time consuming. Read/write operations into and out of memory at the node are particularly time consuming.

Full network coding used in a peer-to-peer system is also described in our earlier US patent application, "Content Distribution Using Network Coding" which was published on 26 Jan. 2006 as US-2006-0020560-A1.

Group Network Coding

Group network coding is similar to full network coding but coding is on the basis of groups of blocks rather than all the blocks of content forming the file being distributed. GNC is a variation of full network coding. In GNC the original content is divided into Groups of service blocks and network coding is performed just on the blocks of each Group. There are various different methods of group network coding and these reduce the processing load at peer nodes as well as the time taken to encode or decode blocks as compared with full network coding. Any suitable method of group network coding can be used. For example, our earlier European Patent Application no. 05270098.6 filed on Dec. 22, 2005 entitled "Encoding and Decoding Optimisations" describes suitable methods of group network coding.

In a preferred embodiment of GNC used herein an algorithm to partition the file into blocks and groups is provided as follows:

The algorithm to partition the file into blocks and groups is as follows:

1) A file of length L, and a target block size $B_T$ are specified, for example by being preconfigured.
2) The number of blocks is first calculated as the minimum number of blocks required to fit all the file content, $B = \text{Ceiling}(L/B_T)$. $(L/B_T)! = \text{Ceiling}(L/B_T)$, the last block is padded with zeroes for encoding purposes.

For example, a file of 1001 bytes with a target block size of 10 bytes will divide into 101 blocks of 10 bytes, with a last block containing just one byte of actual information. The last block is logically padded out with zeroes, but the padding is never transmitted as each Content management module 300 knows what size to expect for the last block.

Once the number of blocks is calculated, the algorithm determines the number of Groups: for every 16 (or other suitable number) blocks in the file a group is created. If the number of blocks is not multiple of 16, the last Group will have less than 16 blocks and the Network Coding operations will be done only on that number of blocks. For example, if the number of blocks of a file is 18, two groups will be required: one with 16 blocks and another with just two blocks*

The virtual information such as zeros used to pad the last block are removed during reconstruction.

Content Management Module

Figure 3:
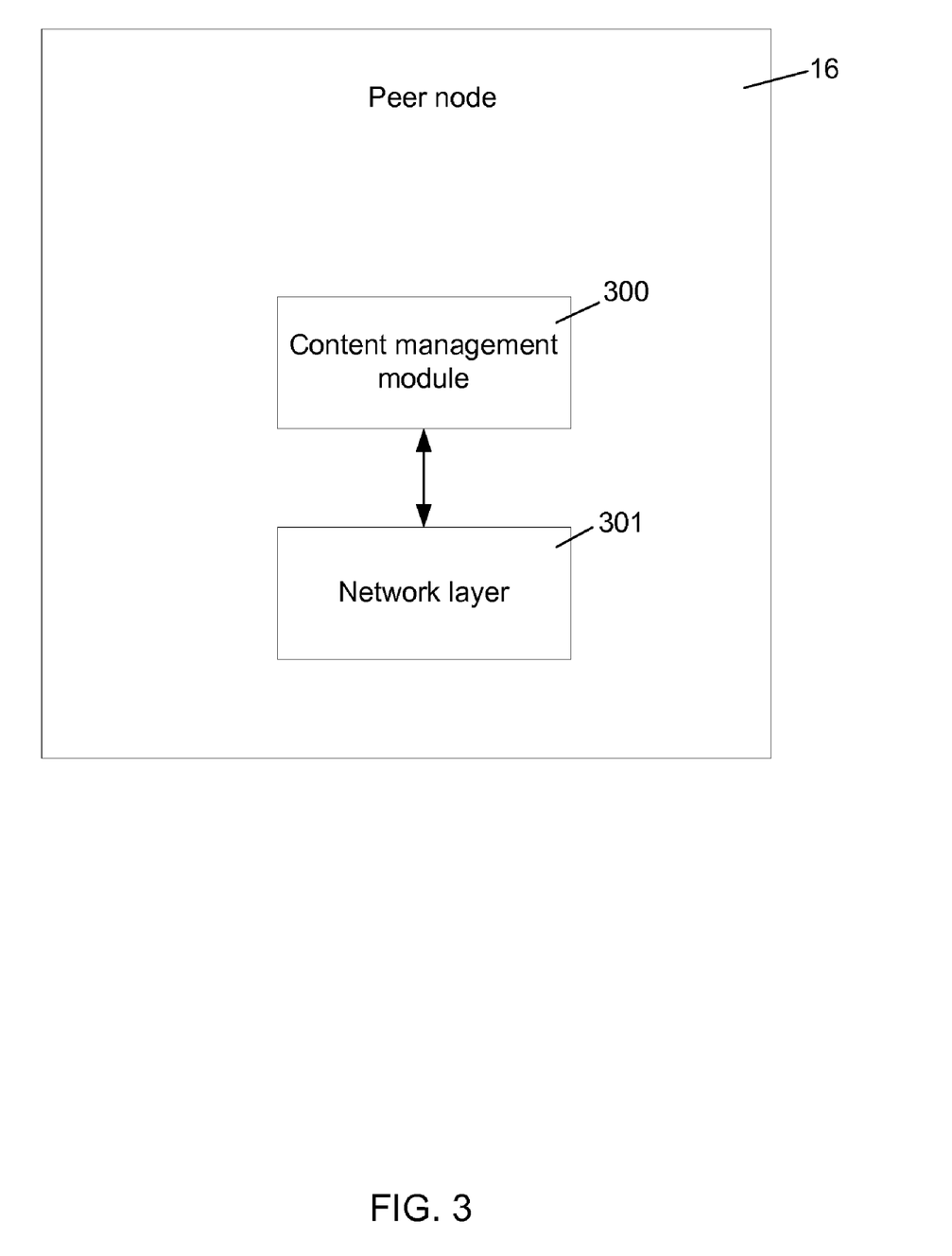
FIG. 3 is a schematic diagram of a peer node showing a content management module.

In order to manage content in a peer-to-peer network we provide a content management module at each peer node. This content management module is a software construct in a preferred embodiment although it can be provided as dedicated hardware or in any other suitable manner. It preferably provides functionality for producing, validating and exchanging encoded content between different instances of the content management module. FIG. 3 is a schematic diagram of a peer node 16 showing a content management module 300 in communication with a network layer 301 at the peer node. For example, the peer node comprises a computer with an internet connection to the peer to peer cloud. It comprises an operating system and other software and/or hardware as known in the art for enabling a peer-to-peer application to operate in order to participate in distribution of content.

The network layer provides functionality to enable the peer node to communicate with other peer nodes in the cloud 11 using any suitable methods known in the art. For example, our peer-to-peer content distribution protocol is designed to operate over any suitable packet-based communications protocol which guarantees ordered delivery. TCP is one possibility. Communication packets are sent across a transport which guarantees intact, correctly sequenced delivery of data.

In a preferred embodiment, the content manager 300 is a pluggable module in the sense that it can be used in concert with the network layer 301 without the need for integration or bespoke interface arrangements with the network layer 301. The network layer comprises a state machine such that it will be in certain states depending on what packets have been sent or received at the network layer. The content manager 300 is preferably formed such that it is able to interwork with the state machine of the network layer in the modular manner described above.

The pluggable architecture of the content management module 300 is preferably also arranged so that different encoding schemes can be implemented using one generic negotiation protocol. That negotiation protocol is referred to herein as a content request/response cycle.

Content Request/Response Cycle

Figure 4:
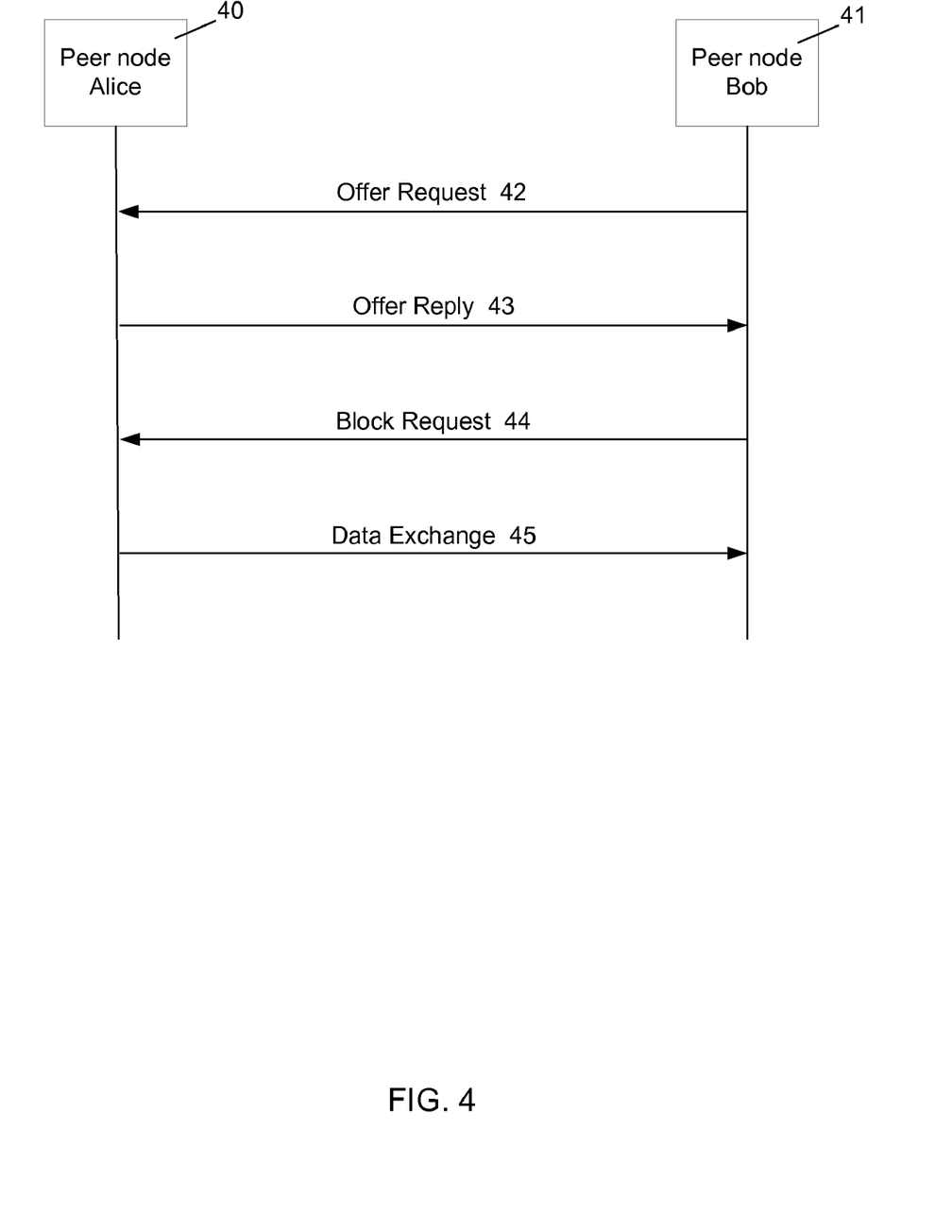
FIG. 4 is a high level message sequence chart for a negotiation protocol.

In preferred embodiments we arrange the content management module 300 to use a content request/response cycle in order to negotiate about blocks of content with other peer nodes. This cycle, at a high level, comprises three steps, an offer request, an offer reply and data verification. FIG. 4 is a high level message sequence chart illustrating this process. Additional messages such as acknowledgment messages may be used as known in the art and these are not shown for clarity.

Suppose that peer node Alice 40 has a complete copy of a file to be distributed. Peer node Bob 41 requires the file. Alice slices the content into blocks of fixed size using any suitable method. Alice and Bob now need to negotiate what blocks or combinations or blocks to exchange. A goal of this negotiation is to make sure that the content Alice sends to Bob will be useful and is not content Bob already has. It is also possible for Alice to have only a subset of blocks required to form the file being distributed. These blocks could be encoded at the peer node labelled 'Alice' or may have been received by Alice in encoded form. Also, in practice, each peer node in the cloud 11 is able to adopt both Alice and Bob's roles. Each peer node is able to send and receive blocks simultaneously to and from any number of other peers in the cloud.

Bob sends an offer request message 42 asking Alice what blocks she can offer him. Alice replies using an offer reply message 43 with a description of blocks she can provide. Bob examines the offer reply and asks Alice to send him one of the offered blocks that is useful to him (see block request message 44). During data exchange 45 Alice sends Bob the block he is interested in. Once Bob receives the block it is verified for integrity during a data verification step at node 41. These steps can be repeated until Bob receives all the blocks of the original content.

By using a content request/response cycle in this way, comprising at least messages 42, 43 and 44 we are able to achieve block negotiation in a simple and effective manner. We have found this method particularly advantageous for enabling the content management module 300 to be pluggable with respect to the network layer in situations where the offer reply 43 is highly likely to comprise innovative content for Bob. This is the case at least when full network coding and GNC are used. In addition, this negotiation protocol provides a generic method that we can advantageously use in conjunction with different encoding schemes.

In the case where the offer reply 43 offers no innovative content to Bob, Bob is able to issue another offer request 42 to Alice. Alternatively, Bob is able to drop the connection to Alice and seek a connection with another peer in the cloud.

In the case that full network coding is used the offer reply message 43 can comprise a linear combination of all the available encoded blocks at Alice. This increases the likelihood that Alice is able to offer innovative content to Bob.

In some embodiments the content request/response cycle is added to by enabling Bob and/or Alice to provide more information. For example, Bob can either partially or completely describe to Alice what blocks he requires. In such cases the offer request message 42 comprises, for example, details of blocks Bob already has available (this may include blocks Bob has requested from other peers and not yet received by Bob).

It is also possible for Alice to either partially or completely describe which blocks she has available. These could be blocks that Alice has already in encoded form or blocks that she is able to encode. Thus the offer reply message 43 comprises information about all or some of the blocks Alice has available.

In a preferred embodiment GNC is implemented in the peer-to-peer cloud. In this case the negotiation protocol is in high level terms the same as that of FIG. 4 although the additional information is exchanged as now discussed with reference to FIG. 5.

Figure 5:
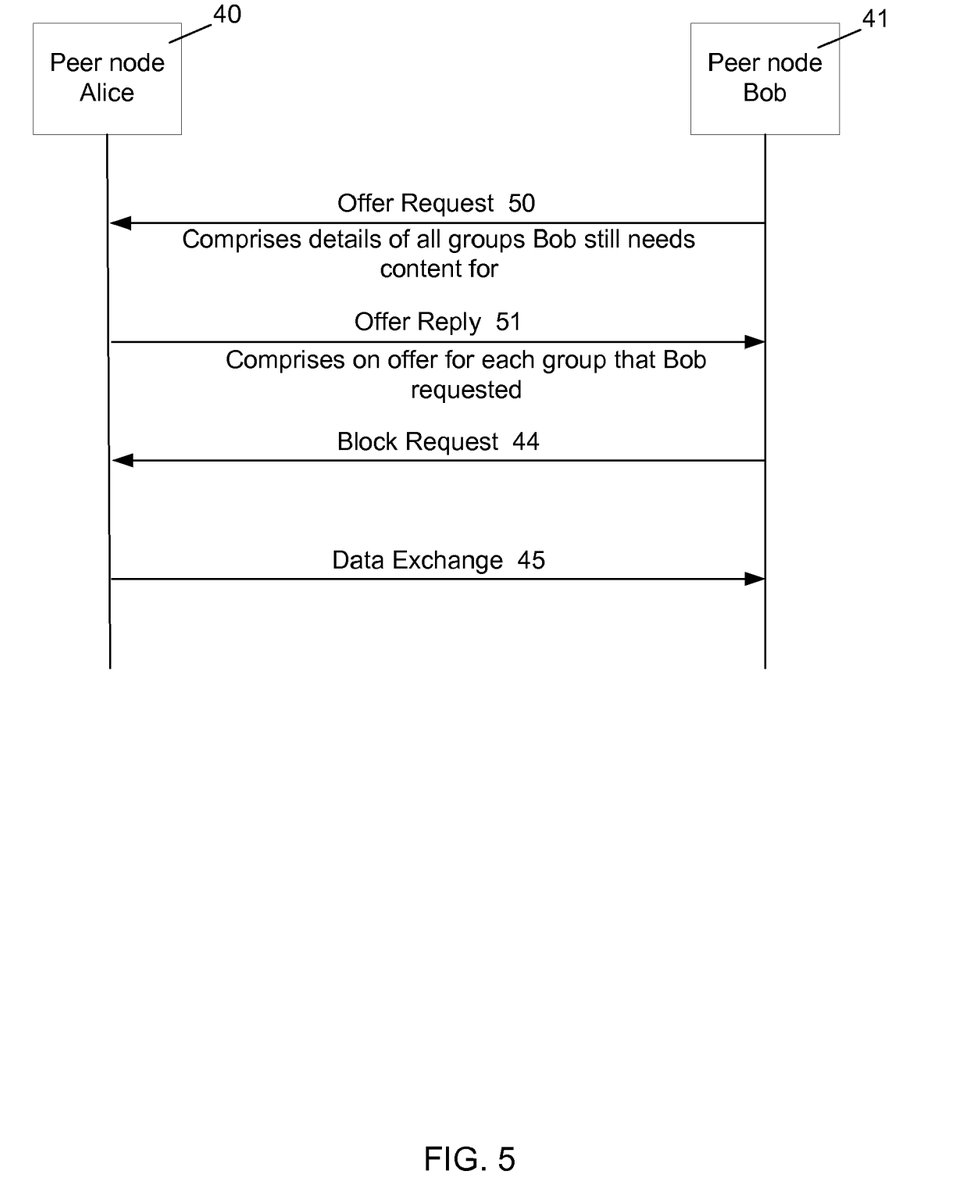
FIG. 5 shows the message sequence chart of FIG. 4 modified for an embodiment using group network coding.

In this embodiment, where GNC is used, the offer request message 50 comprises details of one or more of the Groups that Bob still needs content for. For example, Bob makes a list of Groups he still needs content for and the list is encoded as a bit vector for efficiency. The bit vector is then sent as part of the offer request. However, it is not essential to use a bit vector encoding. Any suitable method of representing Bob's incomplete Groups can be used. An optimisation of using a bit vector to describe which groups content are needed for is advantageous. This allows a compact representation of groups where data is useful. For example, for a 10 GB 10,000 block 500 group file, the full group desirability bit vector would require only 63 bytes.

The offer reply message 51 comprises one offer for each group that Bob requested. For example, a series of offers in a single message. Alternatively the offer reply message 51 can comprise a plurality of individual offer reply messages each having an offer about a single group. Multiple offers may reference the same group in some embodiments. In a preferred embodiment the offers comprise vectors representing blocks that are available. However, it is not essential to use vectors, any suitable type of representation can be used. In the case that vectors are used, for each of the groups which Bob needs content for and Alice has blocks for, Alice returns a vector describing a single offer for that group. However, it is also possible for Alice to return multiple offers for the same group. For example, this is useful in the case that the server has multiple encoded blocks for a given group and doesn't wish to synthesize them into a new combined block. Alice can cache the list of offers that she sends to Bob so that the same offer can be given to multiple peers without having to go through the offer generation process again. Bob analyses each offer received and checks it against any other encoded blocks he has for the group concerned. One of the innovative offers is selected and sent back to Alice as a block request 44. The block request is followed by data exchange 45 and data verification as before.

Peer node Bob is arranged to use any suitable method to select one of the innovative offers. For example selection is made in a substantially random or arbitrary manner. Alternatively, selection is made on the basis of how many blocks Bob already has for the group concerned. This is advantageous in the case that on-the-fly group decoding is used.

By sending 'partial' information in the offer request and offer reply and/or by sending multiple offers in the offer reply stage, we achieve advantages. This enables low-power participants to offer blocks they have already received in their current form, rather than having to synthesise a new offer across all their current blocks and then having to transcode it.

On-the-Fly Group Decoding

In some embodiments peers 16 wait until they have received all encoded content required. The peer then disconnects from the cloud 11 and decodes the content into the original file. In alternative embodiments, on-the-fly group decoding is used. In these embodiments GNC or equivalent coding methods are used. A peer is then able to perform decoding of groups that have enough blocks to be decoded concurrently with block exchange. In this type of situation it is possible to prioritise groups which are almost complete when choosing offers from another peer. By doing this complete groups can be obtained relatively quickly for on-the-fly decoding.

Data Verification

The process of data verification is achieved in any suitable manner. For example, in the case that network coding is used (either full network coding or GNC) a homomorphic hash or secure random checksum (SRC) method is used. In the case that no network coding is used a regular checksum or simple hash can be used or alternatively an SRC or homomorphic hash method. For example, details of suitable SRC methods are described in our earlier European Patent Application no. 06270027.3 filed on Feb. 28, 2006.

Message Format

The messages used by the content management modules to negotiate with one another are of any suitable format. For example, each message is comprised of one or more message elements, each element having a length and a field type. The tables below give an example of contents of each message in a preferred embodiment. The offer request message 42 is referred to below as a Message_Contentrequest, the offer reply message 43 is referred to below as a Message_Contentresponse, the block request message 44 is referred to below as a Message_blockrequest and the message sending the block as part of the data exchange process 45 is Message_blockdata. Please note that these are examples only and other message formats and contents can be used to achieve similar functionality. In this example, there are three columns shown per message element or component. These comprise a data type, a component name and a value of the component (where relevant or known). The data type is selected from DWORD (a double word 32 bit), a WORD (16 bit) and a byte (8 bit).

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

```
MESSAGE_CONTENTREQUEST
    ELEMENT_HEADER
        DWORD              ElemLength            8
        WORD               ElemType              0x0001
        WORD               MessageType           0x0300
    ELEMENT_CONTENTREQUEST
        DWORD              ElemLength
        WORD               ElemType              0x0006
        BYTE               EncodingType
        DWORD              NumGroups
        BYTE[(NumGroups+7)/8]  BitVector
MESSAGE_CONTENTRESPONSE
    ELEMENT_HEADER
        DWORD              ElemLength            8
        WORD               ElemType              0x0001
        WORD               MessageType           0x0301
    ELEMENT_CONTENTOFFER
        DWORD              ElemLength
        WORD               ElemType              0x000b
        BYTE               EncodingType
        ENCODED_OFFER_LIST
            DWORD NumberOfOffers
            ENCODED_OFFER_DETAILS[NumberOfOffers]
                WORD GroupId
                DWORD NumCoeffs
                WORD[NumCoeffs] Coeffs
MESSAGE_BLOCKREQUEST
    ELEMENT_HEADER
        DWORD              ElemLength            8
        WORD               ElemType              0x0001
        WORD               MessageType           0x0302
    ELEMENT_BLOCKREQUEST
        DWORD              ElemLength            12
        WORD               ElemType              0x000c
        WORD               GroupId
        DWORD NumCoeffs    NumCoeffs
        WORD[NumCoeffs]    WORD[NumCoeffs]Coeffs
        Coeffs
MESSAGE_BLOCKDATA
    ELEMENT_HEADER
        DWORD              ElemLength            8
        WORD               ElemType              0x0001
        WORD               MessageType           0x0303
    ELEMENT_BLOCKDATA
        DWORD              ElemLength
        WORD               ElemType              0x000d
        BYTE               EncodingType
        WORD               GroupId
        WORD               Padding
        DWORD64            BlockSize
        DWORD64            FragmentOffset
        DWORD              FragmentSize
        BYTE               Flags
        BYTE[FragmentSize] BlockData
```

The steps of the methods described herein may be carried out in any suitable order, or simultaneously where appropriate.

Although the present examples are described and illustrated herein as being implemented in a peer to peer file distribution system, the system described is provided as an example and not a limitation. As those skilled in the art will appreciate, the present examples are suitable for application in a variety of different types of content distribution systems including for example for data replication, for example to update one copy of a database or file tree to the latest form.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual elements, those skilled in the art could make numerous alterations to the disclosed embodiments without departing from the spirit or scope of this invention.

The invention claimed is:

1. A method of negotiating which one or more blocks of content are to be exchanged between two peers in a peer to peer content distribution cloud the method comprising, at a peer node acting as a client node:
   (i) sending an offer request message comprising information about one or more groups of one or more blocks of content encoded using Group Network Coding for which the client node needs content and information which at least partially indicates those blocks of content that are already available to the client node, the offer request message being sent to another peer node acting as a server node to request an offer of one or more blocks of content available from that server node;
   (ii) receiving an offer reply message from the server node comprising information about less than a total number of one or more blocks of content already available from the server node either in Group Network Coding form or that the server node is able to encode using Group Network Coding; and
   (iii) selecting at least one block on the basis of the information in the offer reply message and sending a block request message to the server node to request the selected block(s).

2. A method as claimed in claim 1 wherein the offer request message comprises information which at least partially indicates those blocks of content that are required by the client node.

3. A method as claimed in claim 1 wherein the offer reply message comprises an offer for one or more groups that the client node still needs content for.

4. A method as claimed in claim 1 wherein the offer reply message comprises a plurality of offers for one or more groups that the client node needs content for.

5. A method as claimed in claim 3 wherein said step (iii) of selecting at least one block comprises, for each group, identifying those of the offered blocks which are innovative and wherein the method further comprises selecting one or more of the innovative blocks.

6. A method as claimed in claim 5 wherein the selection of the one or more innovative blocks is carried out on the basis of the amount of content already obtained for one or more groups that the client node needs content for.

7. A method of negotiating which one or more blocks of content are to be exchanged between two peers in a peer to peer content distribution cloud the method comprising, at a peer node acting as a server node:
   (i) receiving an offer request message from another peer node acting as a client node requesting an offer of one or more blocks of content available from the server node the offer request message comprising information about one or more groups of one or more blocks of content encoded using Group Network Coding for which the client node needs content and information which at least partially indicates those blocks of content that are already available to the client node;
   (ii) sending an offer reply message comprising information about one or more blocks of content available from the server node, the information comprising which of the total number of blocks are available from the server node either in Group Network Coding form or that the server node is able to encode using Group Network Coding;
   (iii) receiving a block request message from the client node requesting one or more selected ones of the offered blocks; and
   (iv) sending the requested block(s) to the client node.

8. A method as claimed in claim 7 wherein the offer reply message comprises an offer for one or more groups that the client node still needs content for.

9. A method as claimed in claim 7 wherein the offer reply message comprises a plurality of offers for one or more groups that the client node needs content for.

10. A peer node suitable for acting as a client node in a peer to peer content distribution cloud, and for negotiating which one or more blocks of content are to be exchanged between itself and another peer in the cloud using Group Network Coding the peer node comprising:
    (i) sending an offer request message comprising information about one or more groups of one or more blocks of content encoded using Group Network Coding for which the client node needs content and information which only partially indicates those blocks of content that are already available to the client node, the offer request message being sent to another peer node acting as a server node to request an offer of one or more blocks of content available from that server node;
    (ii) receiving an offer reply message from the server node comprising information about less than a total number of one or more blocks of content already available from the server node either in Group Network Coding form or that the server node is able to encode using Group Network Coding; and
    (iii) a processor arranged to select at least one block on the basis of the information in the offer reply message and to send a block request message to the server node to request the selected block(s).

11. A peer node as claimed in claim 10 further comprising sending an offer request message comprising information which at least partially indicates those blocks of content that are already available to the client node.

12. A peer node as claimed in claim 10 further comprising sending an offer request message comprising information which at least partially indicates those blocks of content that are required by the client node.

13. A peer node as claimed in claim 10 further comprising receiving an offer for one or more groups that the client node still needs content for.

14. A peer node suitable for acting as a server node in a peer to peer content distribution cloud, and for negotiating which one or more blocks of content are to be exchanged between itself and another peer in the cloud using Group Network Coding the peer node comprising:

(i) receiving an offer request message from another peer node acting as a client node requesting an offer or one or more blocks of content available from the server node, the offer request message comprising information about one or more groups of one or more blocks of content encoded using Group Network Coding for which the client node needs content and information which at least partially indicates those blocks of content that are already available to the client node;

(ii) sending an offer reply message comprising information about one or more blocks of content available from the server node, the information comprising which of the total number of blocks are available from the server node either in Group Network Coding form or that the server node is able to encode using Group Network Coding;

(iii) receiving a block request message from the client node requesting one or more selected ones of the offered blocks; and (iv) sending the requested block(s) to the client node.

15. A peer node as claimed in claim 14 wherein the information about one or more groups the other peer node still needs content for is provided as a bit vector.

16. A method as claimed in claim 4 wherein the plurality of offers comprises a plurality of offers for the same group in the case that the server node has multiple encoded blocks for a given group and does not synthesize those into a new combined block.

17. A method as claimed in claim 7 comprising caching the offer reply message at the server node and sending the cached offer reply message to other peer nodes in the peer to peer content distribution cloud without needing to carry out an offer generation process.

* * * * *